(12) United States Patent
Abdallah

(10) Patent No.: US 6,498,605 B2
(45) Date of Patent: *Dec. 24, 2002

(54) PIXEL SPAN DEPTH BUFFER

(75) Inventor: Mohammad A. Abdallah, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,663

(22) Filed: Nov. 18, 1999

(65) Prior Publication Data

US 2002/0118189 A1 Aug. 29, 2002

(51) Int. Cl.[7] .............................. G06T 15/40
(52) U.S. Cl. ..................................... 345/422
(58) Field of Search ........................ 345/422

(56) References Cited

U.S. PATENT DOCUMENTS

| | | | |
|---|---|---|---|
| 5,268,995 A | | 12/1993 | Diefendorff et al. |
| 5,579,455 A | * | 11/1996 | Greene et al. ............... 395/122 |
| 5,949,423 A | * | 9/1999 | Olsen .......................... 345/422 |
| 6,271,850 B1 | * | 8/2001 | Kida et al. ................... 345/422 |

* cited by examiner

Primary Examiner—Mark Zimmerman
Assistant Examiner—N C A-Reindorf
(74) Attorney, Agent, or Firm—Blakely, Sokoloff, Taylor & Zafman LLP

(57) ABSTRACT

An efficient way to determine which objects in a 3D image are to be displayed and which are not because they are obscured by other displayed objects. Displayable elements are assigned depth values defining their relative perceived nearness to the viewer of the image. A comparison of depth values determines which elements are to be displayed and which are not to be displayed because they are obscured by displayed elements. Rather than comparing the depth value of every pixel in a displayable object to determine whether it is to be displayed, the invention compares groups of pixels defined by spans. Minimum and maximum depth values are determined for each span so that depth variations within a span can be accommodated. Masks are used when only partial spans are to be considered because some pixels in a span are outside the pixel boundaries being considered in a particular comparison.

28 Claims, 4 Drawing Sheets

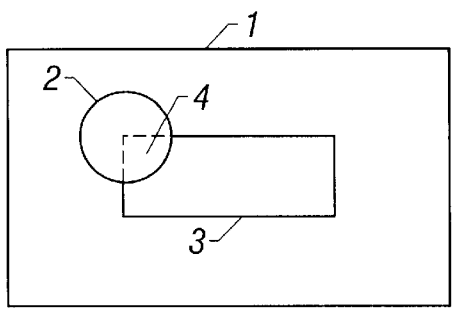
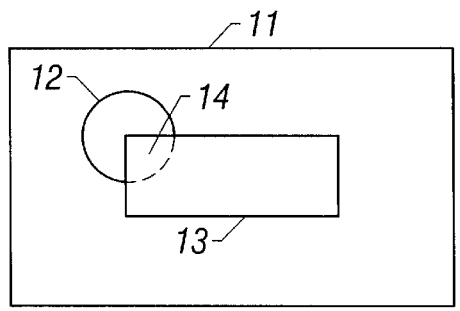
FIG. 1A
*(Prior Art)*
FIG. 1B
*(Prior Art)*
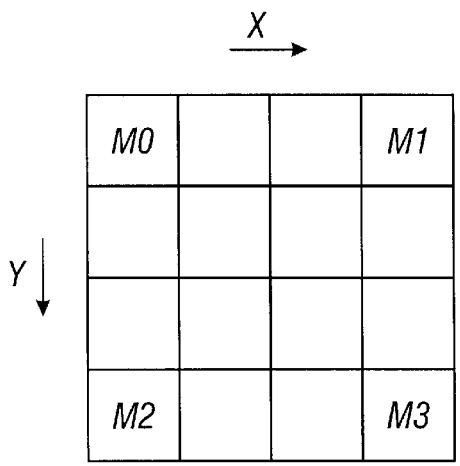
FIG. 2
| $C_X$ | $C_Y$ | MIN | MAX |
|---|---|---|---|
| + or 0 | + or 0 | M0 | M3 |
| + or 0 | − | M2 | M1 |
| − | + or 0 | M1 | M2 |
| − | − | M3 | M0 |
FIG. 3

PIXEL SPAN DEPTH BUFFER

BACKGROUND OF THE INVENTION

1. Field of the Invention

The invention pertains to the field of three dimensional (3D) graphics emulation. More particularly, it pertains to the determination of which pixels to show when some objects in a displayed image obscure others due to differences in apparent distance from the viewer.

2. Description of the Related Art

In a 3D scene, the objects that are nearer to the viewer may obscure the view of other objects, which are farther away. As the perspective of the viewer changes, or the objects move with respect to one another, the view of objects which are fully or partly obscured may also change. When a two-dimensional graphics system emulates a three-dimensional scene, the graphics system which generates the image must maintain image data for every potentially displayable object, but will only display the closest object when two or more objects occupy the same perceived line of sight. For this reason, graphics systems typically maintain distance information on each displayable object, so that they can determine which object in a particular part of the screen is nearest and should be displayed, and which objects will be obscured and therefore not displayed.

FIGS. 1a and 1b illustrate this principle by showing two images containing a rectangular object and a circular object which overlap each other. In FIG. 1a, circular object 2 appears in front of rectangular object 3, overlapping it in area 4. In FIG. 1b, rectangular object 13 appears in front of circular object 12, overlapping it in area 14. (Note: dotted lines are shown in the figures to illustrate the boundaries of the overlapped area, but would not appear in the actual image.) In FIG. 1a, overlap area 4 would be filled in with picture elements (pixels) depicting the circular object 2, while the pixels depicting rectangular object 3 would not be used in overlap area 4. Conversely, in FIG. 1b overlap area 14 would be filled in with pixels depicting rectangular object 13, while the pixels depicting circular object 12 would not be used in overlap area 14.

To determine which objects should be perceived as nearer, depth values are assigned to every pixel of every displayable object. Depth values represent the apparent relative distance of the object from some reference point, such as the viewer. If two or more displayable objects encompass the same pixel location in the image, only the pixel from the nearest object (smallest depth value) should be displayed. A pixel depth buffer is used to maintain depth information about every pixel in the image, describing the depth of the nearest perceived object at each pixel location.

The conventional approach to creating the depth buffer is to compare the depths of the various objects at every pixel location. Each displayable object has a separate depth value for every pixel encompassed by that object, with the depth value describing the relative depth, or apparent distance from the viewer, of the object at that pixel location. A depth comparison is performed for each pixel of the displayed image. If the pixel for the object under consideration (the current pixel) is closer than the pixel presently displayable at that location (the reference pixel), then the current pixel will replace the reference pixel and the current pixel's depth value will go into the pixel depth buffer for that pixel location. If the reference pixel is closer than the current pixel, then the reference pixel will remain as the displayable pixel, and the reference pixel depth information will remain in the pixel depth buffer for that pixel location. After the pixels of all objects which could occupy each pixel location have been considered in this manner, each pixel referenced in the pixel depth buffer will represent the nearest perceived object at that particular pixel location, and that pixel will be the one to display.

Occasionally a programmer may wish to display something other than the nearest object, such as the farthest object. In such special effects situations, different pixels would win the comparison tests, but the basic technique of a pixel-by-pixel comparison is the same. Since the comparisons are performed on a pixel-by-pixel basis, there is a potential need to perform multiple comparisons for every pixel in the displayed image. As graphic images achieve increasingly higher resolution with more pixels per image, devoting this amount of computation solely to the decision of which objects to display can use up an excessive amount of processor and memory bandwidth, and can limit the throughput of the graphics processing system.

SUMMARY OF THE INVENTION

The invention includes a method of using a depth buffer that includes identifying a first pixel group with a first set of depth values and identifying a second pixel group with a second set of depth values. A first span is formed including the minimum and maximum depth values from the first set, and a second span is formed including the minimum and maximum depth values from the second set. The minimum and maximum values of the first span are compared with the minimum and maximum values of the second span. At least a portion of the first span or the second span is saved as a result of the comparison.

BRIEF DESCRIPTION OF THE DRAWINGS

FIGS. 1a and 1b show overlapping objects in a prior art two-dimensional image.

FIG. 2 shows a 16-pixel block for a span.

FIG. 3 shows a chart for determining minimum and maximum depth values in the pixel block of FIG. 2.

DETAILED DESCRIPTION OF THE INVENTION

Figure 4A:
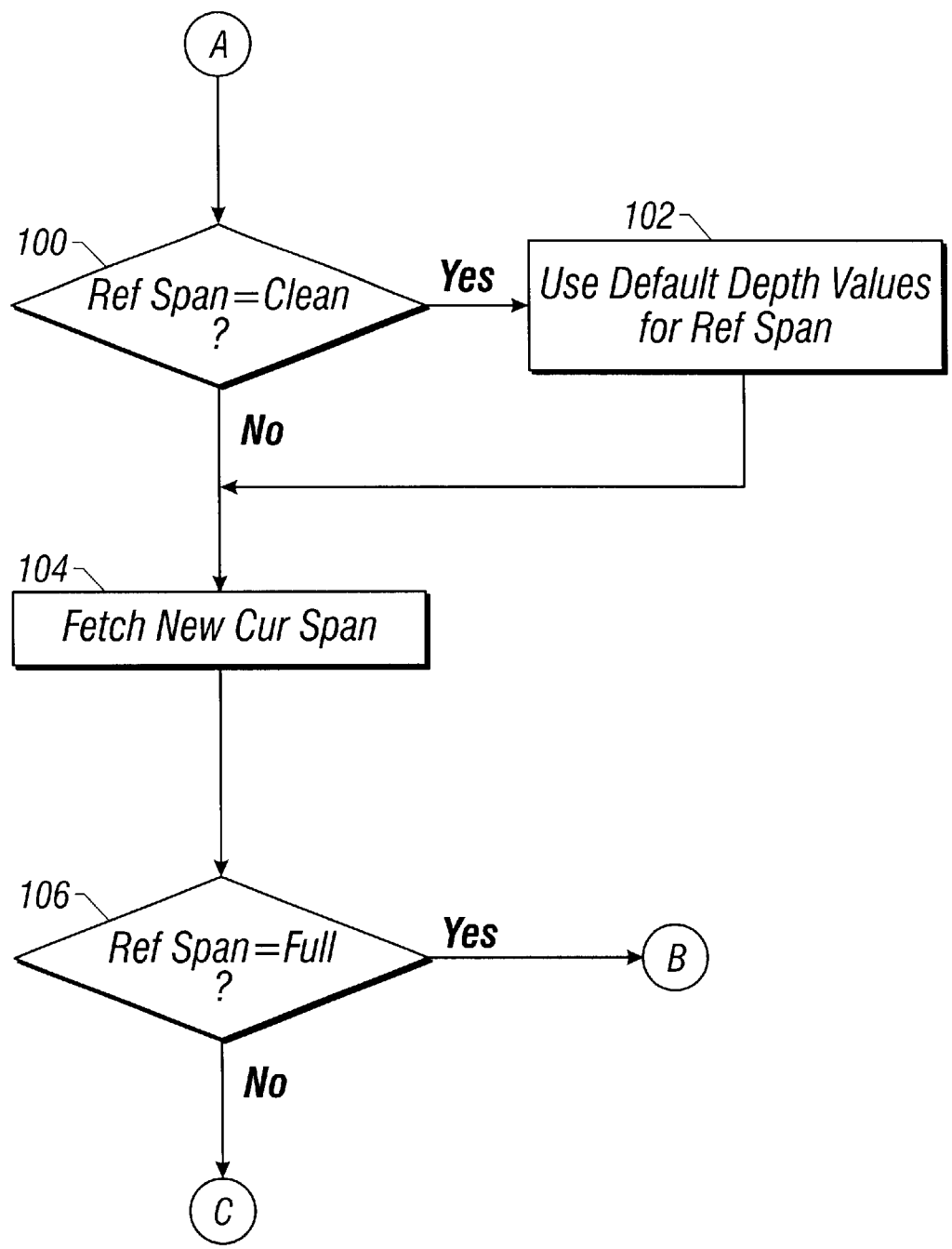
FIGS. 4A, 4B, 4C show a flow chart of a span comparison procedure.

The system of the invention identifies groups of contiguous pixels, and whenever possible performs a depth comparison for each group rather than a depth comparison for each pixel within the group. The relevant depth information for each group is referred to as a 'span', since it spans the depth values of several pixels. Once the relevant comparisons have been performed by this more efficient approach, the pixels represented by the closer spans can then be written into a standard pixel depth buffer. One embodiment uses a 4×4 block of sixteen pixels for each span as illustrated in FIG. 2, but a span can encompass other sizes and shapes of blocks. The span approach requires less processing time since fewer depth comparisons need to be performed. It can also reduce other related processing and memory requirements—since a span that fails the comparison won't be displayed, there is no need to store information or perform other graphics computations such as color and texture computation on any pixel within that span.

Note: Throughout this disclosure, reference is made to the span or pixel that wins a comparison as belonging to the closest perceived object, and this is the normal graphics representation. However, the rules under which a span or pixel wins a given comparison can be dynamically changed at any time to create special visual effects or to accomplish some other goal. The invention is intended to cover all such changes in the comparison rules, but for simplicity the examples given herein are described in terms of the span or pixel of the closest perceived object winning each comparison.

The invention compares a current span with a reference span. Both spans represent the same pixel locations in the image. The current span contains pixel information for the object under consideration. The reference span contains pixel information for objects that have already been considered and are the nearest (smallest depth values) of the objects so far considered, with the reference span held in a span depth buffer. The span depth buffer therefore contains span information on spans that represent the default display pixels—the pixels that will be displayed unless they are subsequently replaced by pixels represented by a current span that has been determined to be closer.

If all the pixels within any given span had the same depth value, then a single numerical comparison would be sufficient to compare two spans with each other. However, a span commonly contains pixels with different depth values, so this simplistic approach has limited usefulness. To handle the general case, each span is assigned a minimum (Min) and maximum (Max) value. Min is defined as the depth value of the pixel that is perceived as closest to the viewer, and Max is defined as the depth value of the pixel that is perceived as farthest from the viewer. The Min and Max of the current span are compared to the Min and Max of the reference span through two tests: 1) If the Min of the current span is larger than the Max of the reference span, the current span is removed from consideration because all of its associated pixels are necessarily farther away than all the pixels associated with the reference span. 2) If the Max of the current span is less than the Min of the reference span, then the current span replaces the reference span because all of its associated pixels are necessarily closer than all the pixels associated with the reference span. In this latter case, the current span becomes the new reference span, and a new current span may be fetched for a subsequent comparison with this new reference span.

If the current and reference spans intersect, then the depth test is performed on a pixel-by-pixel basis. Intersection of the spans occurs when the Min and Max values of the current and reference spans overlap so that some but not all pixels in the current span are closer than the corresponding pixels in the reference span (or vice-versa). For instance, the two spans would intersect if any of these four conditions is met: 1) the reference Min is greater than the current Min and less than the current Max, 2) the current Min is greater than the reference Min and less than the reference Max, 3) the reference Max is greater than the current Min and less than the current Max, or 4) the current Max is greater than the reference Min and less than the reference Max. However, it is not necessary to perform any of these tests. If both of the comparisons in the previous paragraph fail, then the spans must necessarily intersect and at least one of these conditions is true.

A mask can be used to test a partial span. Both the current span and the reference span can be masked. By masking out some of the pixels associated with a span to remove them from the comparison test, the remaining pixels can be compared as a group as they would be in a full span test. Prior to this comparison, Min-Max values can be determined for the remaining (unmasked) pixels, since the previous Min and Max pixels for the full span might be masked out and can therefore be removed from consideration. Alternately, the Min-Max values for the full span can be kept and used in a comparison even if the span is masked. Min-Max values for a partial span will be within the Min-Max values for the full span, so any test that passes or fails when using the full span values will give the same results when using partial span values. Different results might be obtained if the spans intersect, but those cases can default to a pixel by pixel comparison.

Span masks may be used in various instances. One such instance is when a span encompasses the edge of a displayable triangle. Most computer-generated graphics objects are conceptually constructed of planar triangles in three-dimensional space. Although a depicted object may have a curved surface in real life, this curved surface can be efficiently approximated with a series of contiguous triangles. The sharper the curved surface being depicted, the smaller the triangles must be to realistically simulate that surface. In normal graphics processing, all the pixels within a triangle are considered in isolation from any adjoining triangles. Since a span might encompass some pixels within the current triangle and some pixels outside it, only the pixels within the triangle are considered. To prevent the pixels outside the triangle from being considered, they are masked out. The Min and Max values for that span can be determined from the unmasked pixels.

At a different time, when the adjoining triangle is being analyzed, a span representing the same image location will be used for depth comparisons, but will have a different mask to permit only the pixels within the adjoining triangle to be considered. Since different objects are constructed of different triangles, the triangle represented in the current span and the triangle represented in the reference span may encompass different pixel locations within the blocks of pixels under consideration. Thus the current span and the reference span can each have their own, separate masks.

The comparison of a partial current span with a partial reference span can introduce complexities into the otherwise straightforward span comparison process, especially if the two masks only partially overlap. In one embodiment, this complexity is ignored by only comparing full spans. Partial spans can be dealt with in a process that is external to the normal span comparison process. In another embodiment, this complexity is ignored if the unmasked pixels of the current span are a subset of the unmasked pixels of the reference span, and the spans are compared as if both were full spans.

A span can be labeled as full or partial. A full span has no masked pixels associated with it, while a partial span has some associated pixels which are masked. An indicator (such as a bit) can be used to flag a span as either full or partial, so that the appropriate processing can be initiated for that span. A span can be changed from full to partial or partial to full as its characteristics change.

Various methods may be used to determine which pixels represent the Min and Max values in a span. One approach is to compare the depth values of every unmasked pixel associated with the span. Each triangle used in constructing a visual object represents a planar surface with a defined slope, or depth gradient. The depth value of any given pixel within the triangle can be determined by the formula:

$$Z = C_0 + C_X * X + C_Y * Y$$

where $C_0$ is a constant representing the depth value at a predetermined reference point in the plane of the triangle, X and Y represent the distance from the reference point to the selected pixel in the x and y directions, and $C_X$ and $C_Y$ are constants representing the gradient of the depth values in the x and y directions. All the constants in this equation are determined when the triangles are constructed, so the depth values of every pixel may be easily calculated.

However, a much simpler approach can be used when a full span is being considered. Since a full span will be completely within one of the aforementioned triangles, the associated depth gradient of the depicted surface will necessarily place the Min and Max values at the corners of the span. This is illustrated in FIG. 2, which shows a 4×4 block of pixels with the corners labeled M0–M3. Depending on the depth gradients, the depth value of the pixels will increase or decrease linearly in the x direction and will increase or decrease linearly in the y direction. FIG. 3 indicates the Min and Max pixels of FIG. 2 for the various combinations of depth values increasing from left to right ($C_X$=+), decreasing from left to right ($C_X$=−), increasing from top to bottom ($C_Y$=+), or decreasing from top to bottom ($C_Y$=−). For the case of zero gradient ($C_X$ and/or $C_Y$=0), Min and Max are the same along the relevant axis and either corner pixel may be used. For simplicity, the corner pixels for zero gradient in FIG. 3 have been chosen to be the same as for a positive gradient. Thus, the Min and Max values can be determined by using the polarity of constants $C_X$ and $C_Y$ to select which corner represents Min and which corner represents Max, and then using the aforementioned formula to calculate only those two values.

Min and Max values for a span can be stored in various ways. One way is to store the Min and Max values directly. Another is to store one of the values (such as Min) and store a delta value that represents the deviation between the Min and Max values. The method used affects the specific manner of calculating differences, but either method can be used effectively.

Other data can also be stored for each span. For example, one bit can indicate whether the reference span is clean or dirty. A reference span becomes clean when it is initialized, which typically occurs when a new image is to be constructed, and the default depth for every pixel is set to a large value so that all subsequently considered objects will be in front of it. Whenever a new depth value from a current span overwrites a default depth value in the reference span, the reference span becomes dirty. The clean/dirty bit can be checked with each read access to the reference span. If the bit indicates dirty, then the actual current and reference spans are compared in the normal manner. If the bit indicates a clean reference span, then default values can be used for all pixels in the reference span when doing comparisons. In another embodiment, if the clean/dirty bit indicates a clean span, the depth comparisons can be dispensed with since all pixels being considered in the current span are necessarily closer, and the current span will become the new reference span. This makes the reference span dirty since it no longer contains only default values, and the clean/dirty bit is set accordingly.

Another bit can indicate whether a span is full or partial. This indicator can be used to branch into the specific processing needed for each condition. Several bits can represent the mask itself, with each bit indicating the masked/unmasked status of a particular pixel in the span. Whenever the mask changes because a previously masked pixel is to be unmasked, the newly unmasked pixel can be compared to the existing Min and Max values to determine if either value needs to be changed. Similarly, if a previously unmasked pixel is to be masked, if that pixel represented the Min or Max value, a new Min or Max value can be determined from the remaining unmasked pixels.

Figure 4B:
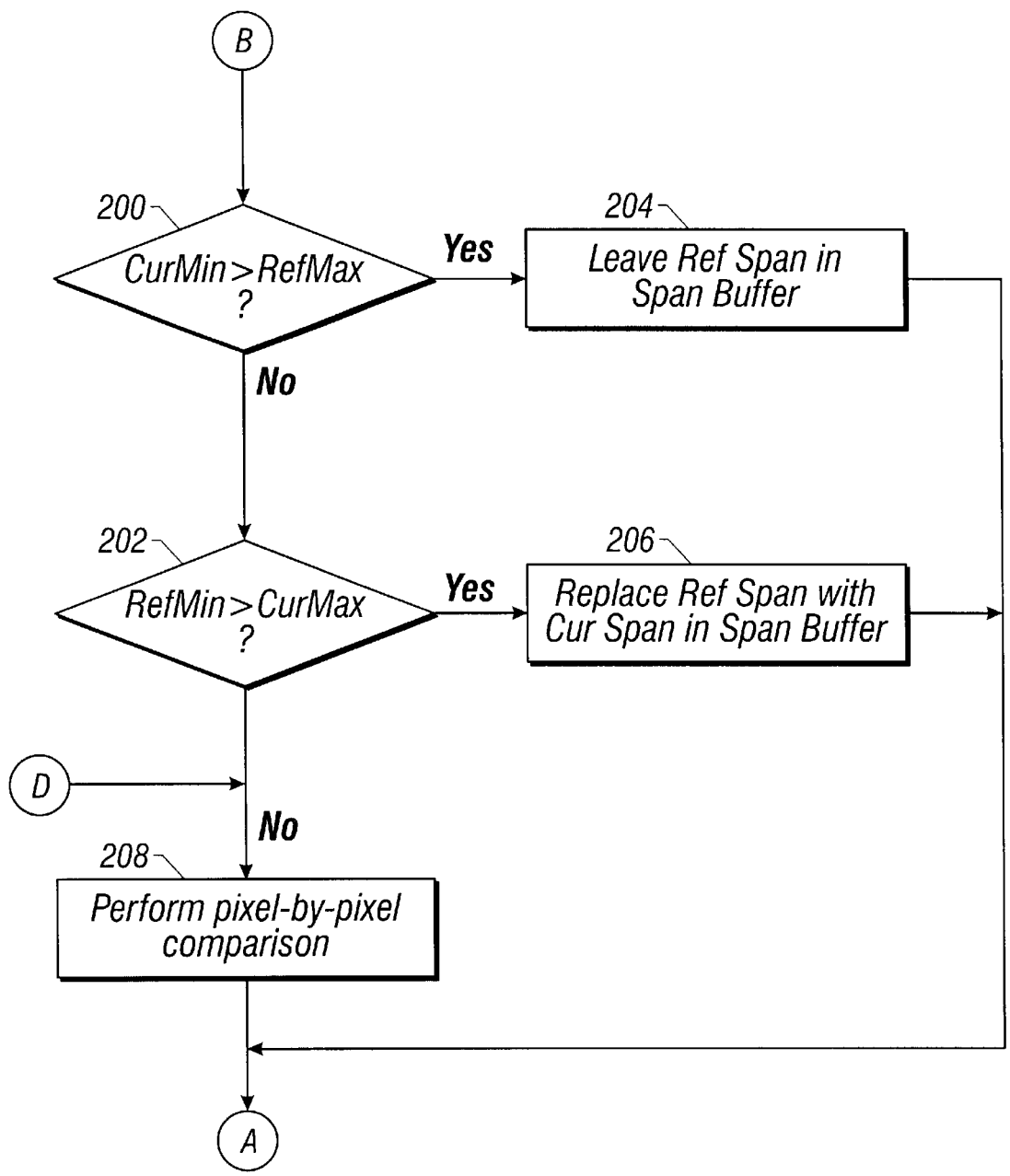
Figure 4C:
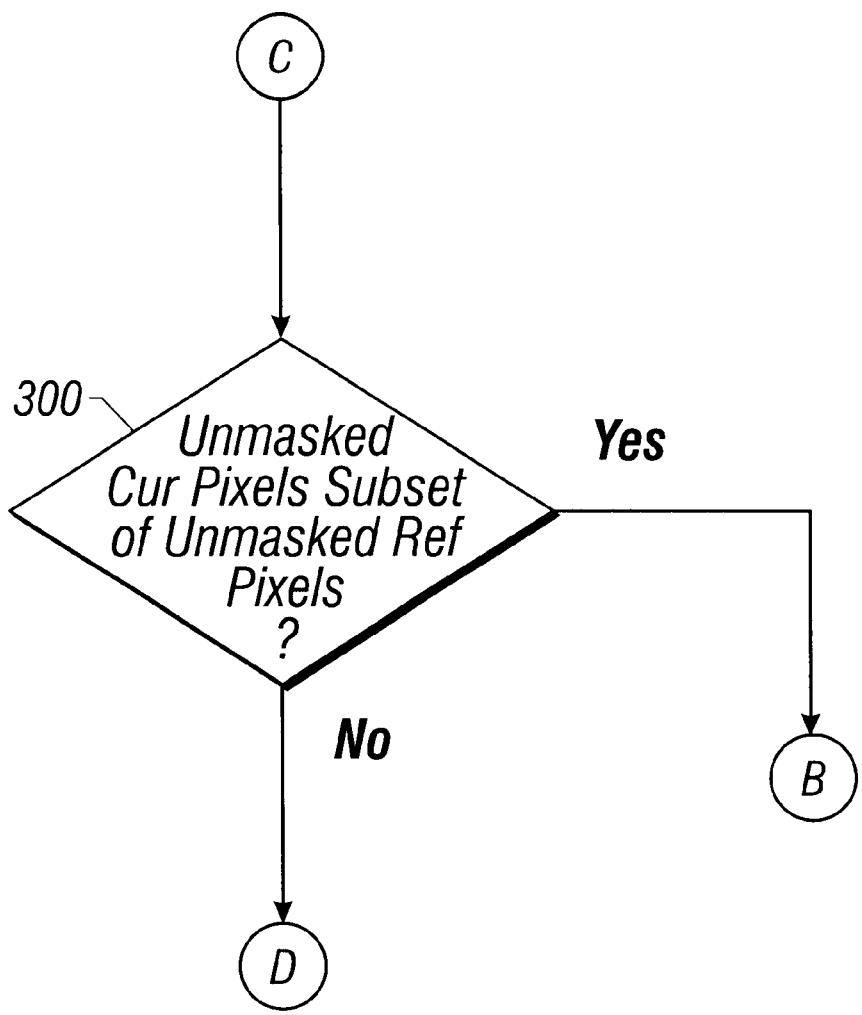

FIGS. 4A, 4B, 4C show a flow chart of the process followed in one embodiment. Beginning at point A of FIG. 4A, the status of the reference span is examined at block 100. If the span is clean, i.e., if it has not previously been written over with a current span, then the reference span is initialized with default depth values at block 102. Then the current span is fetched at block 104 and the full/partial status of the reference span is checked at block 106. If the reference span is full (no masked pixels), then the flow proceeds to point B of FIG. 4B. If the reference span is partial, then the flow proceeds to point C of FIG. 4C.

Continuing at point B of FIG. 4B, the minimum value of the current span (CurMin) is compared with the maximum value of the reference span (RefMax) at block 200. If CurMin is larger than RefMax, this indicates that all the pixels associated with the reference span would be visually in front of all the pixels associated with the current span, so at block 204 the reference span remains and the current span is discarded. Control is then returned to point A in FIG. 4A for the next span comparison. If CurMin is not larger than RefMax, then the minimum value of the reference span (RefMin) is compared with the maximum value of the current span (CurMax) at block 202. If RefMin is larger than CurMax, this indicates that all the pixels associated with the current span would be visually in front of all the pixels associated with the reference span, so the reference span is overwritten by the current span in the span depth buffer at block 206. The data from this current span now effectively becomes the data of the reference span for any future comparisons, and control is returned to point A in FIG. 4A. However, if RefMin is not larger than CurMax at block 202, this indicates that the reference and current spans intersect, so a pixel-by-pixel comparison is performed at block 208 to determine which of the current pixels and which of the reference pixels will survive as reference pixels for future comparisons. Control is then returned to point A of FIG. 4A to operate on the next current span.

If the reference span was determined to be a partial span at block 106, then the processing goes to point C of FIG. 4C. At block 300, the reference span mask is compared with the current span mask to determine if all the unmasked current pixels are a subset of the unmasked reference pixels. If so, then processing can proceed to point B of FIG. 4B, where the spans are compared as if they were both full spans. If any of the unmasked current pixels correspond to masked reference pixels, then the unmasked current pixels are not a subset of the unmasked reference pixels. In this case, the possible permutations are too complex to deal with on a span basis, and processing goes to point D of FIG. 4B for a pixel-by-pixel comparison.

When current spans have been compared with reference spans in the described manner, the data remaining in the span depth buffer represents the spans whose associated pixels will be displayed because those pixels represent the objects that appear to be closest to the viewer in that part of the image and are therefore not obscured by other objects. The depth values of the pixels associated with the span depth buffer can then be written into a standard pixel depth buffer. This writing of pixel depth information into the pixel depth buffer can be performed at various times. It can be done after each current span has been considered, after each triangle has been considered, after a single object has been considered, after all objects within a given area have been considered, after all objects in the entire image have been examined, at predetermined intervals, or at any other time.

This is a design choice affected by many other considerations not addressed herein.

Various means can be used to implement the span depth buffer test process. Software or firmware for implementing the method can be stored on a machine readable medium for execution by one or more processors. It can also be implemented with dedicated logic, state machines, or any combination of these items. One embodiment uses a graphics processor dedicated to performing graphics functions.

Regardless of the implementation, the current span can include several types of data: 1) Min and Max values for the current span (or alternately, one of those values and a delta representing the difference between them), 2) one or more bits indicating whether it is a full or partial span, and 3) a span mask if it is a partial span. Similarly, the information in the reference span may include 1) Min and Max values for the reference span (or one of those values and a delta), 2) one or more bits indicating whether it is a clean or dirty span, 3) one or more bits indicating whether it is a full or partial span, and 4) a span mask if it is a partial span. The information for each of the pixels associated with the span is typically not kept in the span buffer, resulting in greatly reduced memory requirements. This small memory requirement can permit the span depth buffer to be placed in cache memory for faster access during the comparison process.

The foregoing description is intended to be illustrative and not limiting. Other variations will occur to those of skill in the art. Such variations are included in the invention, which is limited only by the spirit and scope of the appended claims.

I claim:

1. A method of using a depth buffer, comprising:
   identifying a first pixel group having a first set of depth values;
   identifying a second pixel group having a second set of depth values;
   forming a first span including a first minimum value and a first maximum value from the first set;
   forming a second span including a second minimum value and a second maximum value from the second set;
   comparing the first minimum and maximum values with the second minimum and maximum values; and
   saving at least a portion of one of the first span and the second span as a result of said comparing;
   wherein the first minimum value and the first maximum value are selected only from corners of the first pixel group, and the second minimum value and the second maximum value are selected only from corners of the second pixel group.

2. The method of claim 1, wherein saving includes storing the first span if said comparing determines that the first maximum value is less than the second minimum value.

3. The method of claim 1, wherein saving includes storing the second span if said comparing determines that the second maximum value is less than the first minimum value.

4. The method of claim 1, further comprising executing a pixel-by-pixel comparison of depth values between the first set and the second set if said comparing determines that the first maximum value is not less than the second minimum value and the second maximum value is not less than the first minimum value.

5. The method of claim 1, further comprising masking a portion of the pixels in the first pixel group to avoid inclusion of said portion in the first span.

6. The method of claim 1, further comprising masking a portion of the pixels in the second pixel group to avoid inclusion of said portion in the second span.

7. The method of claim 1, wherein the first and second pixel groups are each four-by-four blocks of sixteen pixels.

8. The method of claim 1, wherein:
   the second span is stored in a buffer; and
   saving includes at least one of:
      overwriting at least a portion of the second span with at least a portion of the first span in the buffer; and
      leaving at least a portion of the second span in the buffer.

9. A graphics display system, comprising:
   a reference span including:
      a reference minimum depth value for a reference block of pixels;
      a reference maximum depth value for the reference block of pixels;
   a current span including:
      a current minimum depth value for a current block of pixels;
      a current maximum depth value for the current block of pixels;
   a comparator to compare at least one of the reference minimum and maximum depth values with at least one of the current minimum and maximum depth values; and
   a selector to select and save one of at least a portion of a reference span and at least a portion of a current span based on a result from said comparator;
   wherein the reference minimum depth value and reference maximum depth value are selected only from corner pixels of the reference block, and the current minimum depth value and current maximum depth value are selected only from corner pixels of the current block.

10. The system of claim 9, wherein:
    the reference minimum depth value is a smallest of depth values of pixels within the reference block of pixels;
    the reference maximum depth value is a largest of depth values of pixels within the reference block of pixels;
    the current minimum depth value is a smallest of depth values of pixels within the current block of pixels; and
    the current maximum depth value is a largest of depth values of pixels within the current block of pixels.

11. The system of claim 9, wherein said at least a portion of a reference span includes the reference minimum and reference maximum depth values for all the pixels in the reference span.

12. The system of claim 9, wherein said at least a portion of a current span includes the current minimum and current maximum depth values for all the pixels in the current span.

13. The system of claim 9, further comprising a current span mask to mask selected depth values for pixels in the current block.

14. The system of claim 9, further comprising a reference span mask to mask selected depth values for pixels in the reference block.

15. A method of using a depth buffer, comprising:
    a) providing a reference span having a reference maximum depth value and a reference minimum depth value selected from corner pixels of a reference pixel group;
    b) fetching a current span having a current maximum depth value and a current minimum depth value selected from corner pixels of a current pixel group;
    c) comparing at least one of the reference maximum and reference minimum depth values with at least one of the current maximum and current minimum depth values; and d) saving one of at least a part of the current span and at least a part of the reference span in a span buffer.

16. The method of claim 15, further comprising:
   e) identifying the contents of the span buffer as a new reference span; and
   f) repeating a) through d) for a different current span and the new reference span.

17. The method of claim 15, wherein providing includes identifying the reference span as a span without masked pixels.

18. The method of claim 15, wherein saving includes replacing the reference span with the current span in the span buffer if the reference minimum depth value is greater than the current maximum depth value.

19. The method of claim 15, wherein saving includes leaving the reference span in the span buffer if the current minimum depth value is greater than the reference maximum depth value.

20. The method of claim 15, wherein comparing includes performing a pixel-by-pixel comparison if the reference minimum depth value is not greater than the current maximum depth value and the current minimum depth value is not greater than the reference maximum depth value.

21. A machine readable medium having stored thereon instructions, which when executed by at least one processor cause said at least one processor to perform:
   providing a first pixel group having a first set of depth values;
   providing a second pixel group having a second set of depth values;
   forming a first span having a first minimum value and a first maximum value from the first set, the first minimum and maximum values representing corner pixels from the first pixel group;
   forming a second span having a second minimum value and a second maximum value from the second set, the second minimum and maximum values representing corner pixels from the second pixel group;
   comparing the first minimum and maximum values with the second minimum and maximum values; and
   saving at least a portion of one of the first span and the second span as a result of said comparing.

22. The medium of claim 21, wherein saving includes storing the first span if said comparing determines that the first maximum value is less than the second minimum value.

23. The medium of claim 21, wherein saving includes storing the second span if said comparing determines that the second maximum value is less than the first minimum value.

24. The medium of claim 21, further comprising executing a pixel-by-pixel comparison of depth values between the first set and the second set if said comparing determines that the first maximum value is not less than the second minimum value and the second maximum value is not less than the first minimum value.

25. The medium of claim 21, further comprising masking a portion of the pixels in the first pixel group to avoid inclusion of said portion in the first span.

26. The medium of claim 21, further comprising masking a portion of the pixels in the second pixel group to avoid inclusion of said portion in the second span.

27. The medium of claim 21, wherein the first and second pixel groups are each four-by-four blocks of sixteen pixels.

28. The medium of claim 21, wherein:
   the second set is stored in a buffer; and
   saving includes at least one of:
      overwriting at least a portion of the second set with at least a portion of the first set in the buffer; and
      leaving at least a portion of the second set in the buffer.

* * * * *